(12) United States Patent
Shi et al.

(10) Patent No.: US 8,996,803 B2
(45) Date of Patent: Mar. 31, 2015

(54) METHOD AND APPARATUS FOR PROVIDING HIGHLY-SCALABLE NETWORK STORAGE FOR WELL-GRIDDED OBJECTS

(75) Inventors: Guangyu Shi, Cupertino, CA (US); Masood Mortazavi, San Jose, CA (US); Jian Chen, Shenzhen (CN); Venu Gopala Rao Kotha, Bangalore (IN)

(73) Assignee: Futurewei Technologies, Inc., Plano, TX (US)

(*) Notice: Subject to any disclaimer, the term of this patent is extended or adjusted under 35 U.S.C. 154(b) by 1026 days.

(21) Appl. No.: 12/965,538

(22) Filed: Dec. 10, 2010

(65) Prior Publication Data
US 2012/0005424 A1    Jan. 5, 2012

Related U.S. Application Data

(60) Provisional application No. 61/361,247, filed on Jul. 2, 2010.

(51) Int. Cl.
*G06F 12/00* (2006.01)
*G06F 3/06* (2006.01)
*G06F 11/10* (2006.01)

(52) U.S. Cl.
CPC .......... *G06F 3/0643* (2013.01); *G06F 11/1076* (2013.01); *G06F 3/061* (2013.01); *G06F 3/064* (2013.01); *G06F 3/067* (2013.01); *G06F 3/0689* (2013.01)
USPC ......................................... 711/114; 714/6.22

(58) Field of Classification Search
USPC ......................................... 711/114; 714/6.22
See application file for complete search history.

(56) References Cited

U.S. PATENT DOCUMENTS

| | | | |
|---|---|---|---|
| 2006/0206662 A1* | 9/2006 | Ludwig et al. | ................ 711/114 |
| 2009/0201834 A1 | 8/2009 | Xu | |
| 2009/0282048 A1 | 11/2009 | Ransom et al. | |

FOREIGN PATENT DOCUMENTS

| | | |
|---|---|---|
| CN | 1547714 A | 11/2004 |
| CN | 101350807 A | 1/2009 |
| CN | 101710901 A | 5/2010 |
| TW | 200702990 A | 1/2007 |

OTHER PUBLICATIONS

Foreign Communication From A Related Counterpart Application, PCT Application PCT/CN2011/073753, International Search Report dated Aug. 18, 2011, 3 pages.

(Continued)

*Primary Examiner* — Matthew Bradley
(74) *Attorney, Agent, or Firm* — Conley Rose, P.C.; Grant Rodolph; Brandt D. Howell (57) ABSTRACT

An apparatus comprising a plurality of storage nodes comprising a plurality of corresponding storage disks and configured to store data in a distributed manner between the storage disks that achieves a Redundant Array of Independent Disks-0 (RAID0) like performance based on positioning information and without indexing the distributed data. A network component comprising a storage disk configured to maintain a plurality of physical files for different user data that are mapped to different volumes, wherein the volumes are distributed between the storage disk and a second storage disk based on a RAID0 like data distribution scheme without being indexed.

19 Claims, 5 Drawing Sheets

(56) References Cited

OTHER PUBLICATIONS

Foreign Communication From A Related Counterpart Application, PCT Application PCT/CN2011/073753, Written Opinion dated Aug. 18, 2011, 8 pages.

Foreign Communication From A Counterpart Application, Chinese Application No. 201180033192.0, Chinese Office Action dated Oct. 27, 2014, 8 pages.

Foreign Communication From A Counterpart Application, Chinese Application No. 2011800331920, Chinese Search Report dated Oct. 17, 2014, 2 pages.

\* cited by examiner

METHOD AND APPARATUS FOR PROVIDING HIGHLY-SCALABLE NETWORK STORAGE FOR WELL-GRIDDED OBJECTS

CROSS-REFERENCE TO RELATED APPLICATIONS

The present application claims priority to U.S. Provisional Patent Application No. 61/361,247 filed Jul. 2, 2010 by Guangyu Shi et al. and entitled "Method and Apparatus for Providing Highly-Scalable Network Storage for Well-Gridded Objects," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud storage is a model of network online storage where data is stored on multiple virtual servers, generally hosted by third parties, rather than being hosted on dedicated servers. A customer that requires data hosting services can buy or lease storage capacity from cloud storage hosting providers that operate large data centers. The data center operators provide resources in the background, referred to as virtual resources, according to the requirements of the customer and expose them as storage pools, which customers can use to store files or data objects. The resource may be distributed across multiple servers. Typically, cloud storage services may be accessed through a web service application programming interface (API) or through a Web-based user interface. In some cloud storage systems, service providers provide block based storage services to customers or users. Since a provider typically owns the infrastructure of the storage service, it is beneficial for the provider to pursue efficient and highly-scalable design and implementation for providing the storage service to customers. Thus, one important design and implementation objective for providers is to maximize throughput and scalability, such as in the case of relatively large systems.

SUMMARY

In one embodiment, the disclosure includes an apparatus comprising a plurality of storage nodes comprising a plurality of corresponding storage disks and configured to store data in a distributed manner between the storage disks that achieves a Redundant Array of Independent Disks-0 (RAID0) like performance based on positioning information and without indexing the distributed data.

In another embodiment, the disclosure includes a network component comprising a storage disk configured to maintain a plurality of physical files for different user data that are mapped to different volumes, wherein the volumes are distributed between the storage disk and a second storage disk based on a RAID0 like data distribution scheme without being indexed.

In a third aspect, the disclosure includes a method comprising receiving a request to write data to a storage system, wherein the request comprises positioning information, mapping the positioning information into a data volume, data block, and data sector combination, hashing the data volume, data block, and data sector combination, placing a first strip of the data at a location in the storage system based on the hash, and distributing one or more second strips of the data at one or more subsequent locations in the storage system that are separated from the location by an offset.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for providing a block based storage system with improved efficiency and scalability in comparison to other cloud storage systems. The design and implementation of the block based storage system may be suitable for handling file systems that are maintained on a plurality of storage units, and thus provides better efficiency and scalability than other local hard disk drive (HDD) based systems. The block based storage system may scale the storage services efficiently with increasing user demand and without the need for substantially large data volume redistribution among different serving or storage nodes, e.g. in a network. The block based storage system may be managed with relatively less operational requirements and thus less operational expense (OPEX) in comparison to other storage systems. The system scalability may be improved using a self-managed distributed hash table (DHT) based method, which may leverage the topology or hierarchy of the physical infrastructure of the storage system and the characteristics of target storage layout. The system throughput efficiency may also be improved using a data distribution mechanism, which may achieve RAID0 like performance in a relatively highly-distributed and highly-scalable manner. Additionally, a file layout may be used to improve the HDD or storage unit read-write efficiency.

Figure 1:
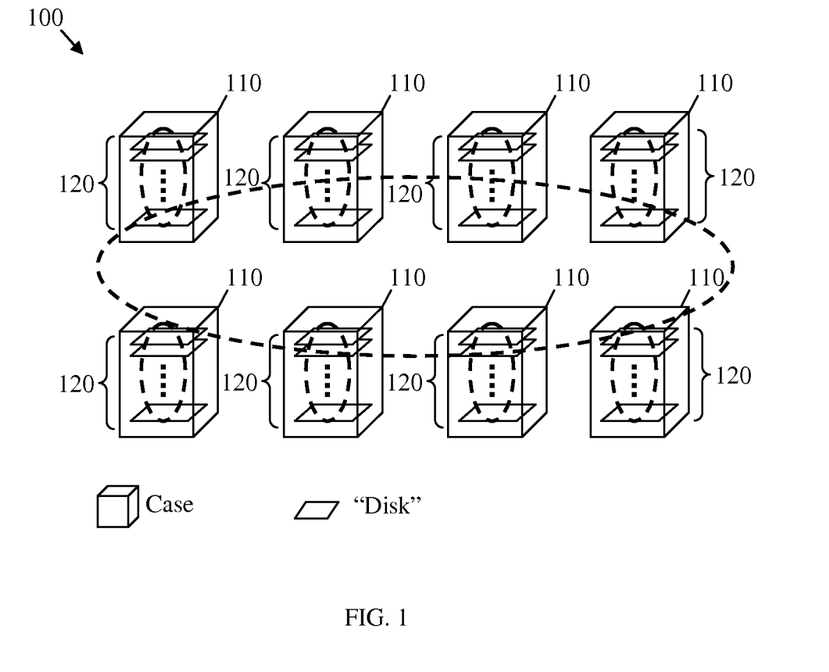
FIG. 1 is a schematic diagram of an embodiment of a storage system topology.

FIG. 1 illustrates an embodiment of a storage system topology 100, which may be used to provide storage services to a plurality of customers or users. The storage system topology 100 may correspond to a "sea of disk" (SoD) topology that is introduced by HUAWEI Core Networks Business Unit (BU) and which is suitable for providing data storage for cloud computing purposes. The storage system topology 100 may comprise a plurality of cases 110, which may each comprise a plurality of disks 120. The disks 120 may comprise a plurality of ATOM, ARM, and/or other processor type based computers. Each of the computers may also comprise other components, such as a Central Processing Unit (CPU), a random access memory (RAM), a Flash/Solid State Drive (SSD), a HDD, a one Gigabit per second (1G) Ethernet card, or combinations thereof, as described below.

As shown in FIG. 1, each case 110 may comprise multiple disks 120. For instance, a case 110 may correspond to a shelf cabinet that comprises a stack of disks 120. The disks 120 and the cases 110 correspond to two hierarchical levels of the storage system topology 100, which may comprise other levels (not shown) that provide a hierarchical storage nodes cluster architecture. For instance, a plurality of cases 110 may be part of a unit, such as a unit of multiple cabinets, and a plurality of units may be part of a container. A plurality of containers may also be part of a data center. The different storage levels of the storage system topology 100 may correspond to or may be accessed and maintained by a plurality of storage nodes, for example in a network. For instance, each of the cases 110 may correspond to a storage node. Alternatively, a plurality of cases 110, or less than all of the disks 120 in the case 110, may correspond to a single storage node.

The storage services provided by the storage system topology 100 may include a Virtual Block Service (VBS), which is a block based storage service. In the case of well-gridded object architecture, such as in the storage system topology 100, the VBS may support APIs or API functions similar to:

put(start_position_key<address_bits>,data<bytes>),
and get(start_position_key<address_bits>,
number_of_items<int>).

The get method above may be supported due to the well-gridded object architecture, for example where data objects may be distributed about proportionally over a plurality of storage nodes. In the put method, the size of data may be used to define or indicate a data object.

When a user or customer requests to read and/or write some files, the storage system topology 100 supported file system may redirect such request to the VBS using an Advanced Technology Attachment (ATA) over Ethernet (AoE), for instance to access the storage system devices over an Ethernet network. Using the AoE protocol to access the storage system devices in a VBS may be optional and other protocols or schemes may be used instead.

In a VBS system, the storage system devices may be accessed using positioning information, such as <Volume, Block, Sector>. The Block data and Sector data sizes may be fixed and the Volume size may be expanded according to user's demand. On the user side, a local file system may manage the mapping of user visible positioning file information, such as <file path, offset>, to the appropriate<Volume, Block, Sector> addressing information for placement of the file's data in the VBS system. Specifically, the user's local file system may be configured to manage mapping files into locations in the data Volume, e.g. in the storage target node(s) or disk(s), which may be divided into a grid of blocks and sectors within blocks of known and fixed sizes.

To address the scalability issue of the storage system, a self-managed DHT scheme may be used to leverage or take advantage of the system's physical infrastructure topology, such as the storage system topology 100, and other special characteristics that may be related to the target storage layout. For example, in the case of the storage system topology 100, it may be difficult to achieve non-blocking Input/Output (I/O) over each pair of disks 120 without substantial investment in the switching and routing infrastructure for the system. To avoid such cost, a two-layered DHT may be used, which may handle an inter-case level (e.g. between the disks 120) and an intra-case level (e.g. between the cases 110). The two-layer DHT may comprise a first DHT for handling the inter-case level, which may be self-managed or maintained by a storage target or node associated with each case 110. The two-layer DHT may also comprise a second DHT for handling the intra-case level, which may be distributed between multiple storage nodes that correspond to different cases 110.

The DHT may be a decentralized distributed system (among different storage nodes) that provides a lookup service similar to a hash table. The DHT may comprise a plurality of (key, value) pairs, which may be used by the storage nodes to retrieve a value associated with a given key. The mapping from keys to values in the DHT may be distributed among the storage nodes, where a change in the set of storage nodes may not substantially change the DHT entries. As such, the DHT may scale to substantially large number of storage nodes and handle the arrivals, departures, and/or failures of storage nodes.

To address the throughput efficiency, a suitable data distributor may be used. The data distributor may be configured to achieve a RAID0 like performance in a distributed manner (between the storage nodes). The data distributor may also be configured to determine how to split and distribute the data of one volume to a number of storage nodes to achieve a relatively high throughput. Typically, existing DHT schemes may use hash functions, such as Secure Hash Algorithm (SHA)-1, to randomize the data distribution. In this case, the output key resulting after performing the function hash(<Volume, Block, Sector>) may be evenly distributed without ordering data blocks and/or sectors, e.g. according to a block number and/or a sector number. In implementing such distribution scheme without ordering blocks and/or sectors, the data placement and retrieval operations may consume a substantial amount of network bandwidth, and cause a lot of random access to each storage node.

One alternative for data distribution is using the Cassandra's "order preserved partitioner" method. However, in a relatively large scale data center, this method may lead to storing one specific volume on one or two storage nodes, which may result in low performance when users attempt random read/write access. Such method may negatively impact volume access (e.g. uneven volume distribution) by multiple applications or a single application that comprises multiple threads. The negative impact on volume access may increase as the level of concurrency and volume increases.

Figure 2:
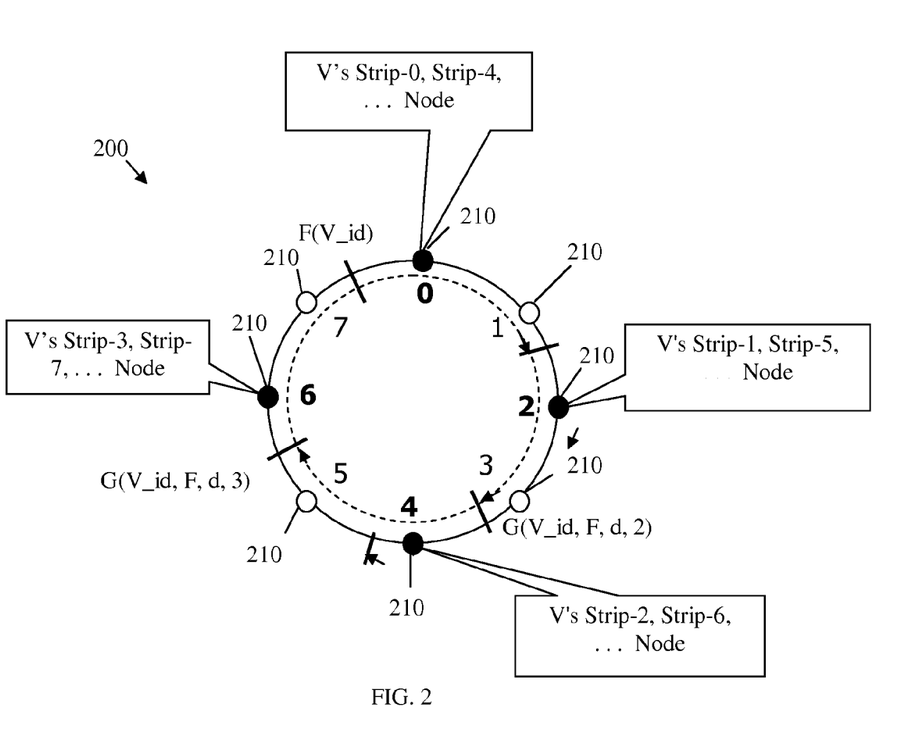
FIG. 2 is a schematic diagram of an embodiment of a data distributor scheme.

FIG. 2 illustrates an embodiment of a data distributor scheme 200, which may be used to improve random data distribution and volume access in a storage system. The data distribution scheme 200 may be used with the DHT scheme above, e.g. based on the storage system topology 100. The data distribution scheme 200 may also support an order preserving partitioner (OPP), such as the OPP included in the Cassandra version 0.6 application. The data distribution scheme 200 may use a Volume identifier (ID), or a user ID if the Volume is binding to a user, as an input parameter of a hash function, F. The data distributor 200 may also use a function that defines the range of the hash function F, Range(F). The function Range(F) may define a "ring" of cyclical values that starts with a minimum value, Min(Range(F)), and ends with a maximum value, Max(Range(F)). Both the hash function F and the range function Range(F) may be known quantities used in the data distributor scheme 200.

The hash function F may be used to generate a random number that indicates a random position on a DHT ID space. The DHT may be cyclical or have algebraic cyclical properties (recurring values), where ID values may belong to a range of cyclical or recurring values (a ring). The data distribution scheme 200 may comprise a DHT cluster that corresponds to the DHT ID space. The DHT cluster may comprise a plurality of nodes 210 (e.g. storage or host nodes) that may be arranged logically in a ring configuration, also referred to herein as a cluster node configuration (NC). The nodes 210 may correspond to the ID values in the DHT ID space.

FIG. 2 illustrates a case where a user may designate a Volume, V, using the Volume's ID, V_id, for example to read/write or access the Volume V. Thus, the function F(V_id) may be used to generate a random position for the Volume V on the DHT ID space. When the function F(V_id) is computed, the location of V_id (or Volume V) may be determined. Specifically, the node 210 that has the least largest value with respect to F(V_id) (e.g. equal or closest higher value) may be designated to store a first strip of Volume V, Strip-0.

A "strip placement function", Node, may be used to map a strip of a volume to a host node as follows:

$$Node(G(V\_id,F,d,strip\_number),NC),$$

where G is a "magic step function", strip_number(s) is a function of a block_id and the number of blocks that may fit in a strip (or block_id plus sector_id and the number of sectors that may fit in a strip), NC is the node configuration, and Node is the strip placement function. The strip placement function Node may provide the target or host node for a strip of the volume. The "magic step function" may start from F(V_id) and make a step size d around the ring of nodes 210, such as:

$$G(V\_id,F,d,s)=F(V\_id)+(d*s)/Range(F).$$

The Node may be a function of node configuration(NC), a hash function(F) that selects the "starting" position of a volume (e.g. Volume V), a step size(d), and a strip_number(s) function.

The data distribution scheme 200 may introduce a system parallelism parameter N that mimics the number of disks in a RAID0 system, where one volume may be distributed and stored on N disks. As such, the data distribution scheme 200 may store a plurality of strips of one volume on N nodes. The strip_number for each strip may depend on the block_id and N, where multiple blocks may fit into one strip. This relationship between the strip_number, the block_id, and N may be described as:

$$strip\_number=(block\_id/s)/N.$$

The strip_number of the first strip of the volume may be set to zero (Strip-0), the strip_number of the second strip of the volume may be set to one (Strip-1), and strip_numbers of subsequent strips may be set similarly. As described above, each strip_number may be mapped to a node 210 using the Node function. For example, the Strip-1's hosting node may be denoted by:

$$Node(G(V\_id,F,d,1),NC).$$

For purposes of brevity, the "magic step function" G may be dropped from the expression above and hence the target or host node may be denoted as:

$$Node(V\_id,F,d,strip\_number,NC).$$

The number of host nodes N for a volume, N, the step size or offset d, and the number of blocks in each strip(s) may be defined in different ways. These parameters may be defined for a volume as a fixed header to a first strip, Strip-0. Alternatively, the parameters may be dynamically assigned as a configuration file for a volume at a node 210 where the first strip may be expected, for example using Node(V_id, F, d, 0, NC). The second approach may be more attractive since the second approach may separate the volume stripping meta data from the volume's actual data. The function Node(V_id, F, d, 0, NC) to obtain the first strip may be independent of d, which may be used when calculating the host nodes from the nodes 210 except the first node 210 that is designated for the first strip (Strip-0).

In one strip placement algorithm, the number of nodes N that may be designated for the volume's different strips may be fixed. For example, N is equal to four in FIG. 2. The offset d may also be fixed, for example d=(Range(F))/N, where N and Range(F) are fixed. The strip placement algorithm may also use a cyclic pattern, e.g. using the strip placement functions above, to distribute the blocks within a volume to appropriate target strips on host nodes. As such, a plurality of strips may be mapped on one or more nodes 210. For example, the first node (labeled 0) may store Strip-0 and Strip-4, a second node (labeled 2) at offset d may store Strip-1 and Strip-5, a third node (labeled 4) may store Strip-2 and Strip-6, and a fourth node (labeled 6) may store Strip-3 and Strip-7.

In another strip placement algorithm, an offset d value may be varied and the Range(F) may or may not be divisible by d. Thus, N may be varied for different data volumes to maintain an about equal storage consumption or data distribution on each strip hosting node. Other algorithms or combinations of the two algorithms above or some of their features may also be used for volume strip placement on the nodes 210.

The data distribution scheme 200 may determine the host node for a <Volume, Block, Sector> combination for requested data using relatively simple calculations, as described above. As such, the user may fetch multiple strips in different nodes if needed in a parallel fetching scheme, where the strips may be obtained at about the same time from the different nodes 210. A local file system at the user environment may perform the parallel fetching scheme, for instance, for a volume that comprises a plurality of files, which may be accessed by a multi-threaded application. The data distribution scheme 200 may place or access the distributed data over the host nodes without using an index for data placement by taking advantage of the representation of a volume as a group of fixed-sized and well-gridded blocks and sectors.

The distribution scheme 200 and the DHT scheme that matches the storage system topology 100 may be applied to any well-gridded objects, for example in the case of a VBS, where the objects may be treated as volumes of distributed data. In well-gridded object architectures, the schemes above may allow data distribution without indexing, which may improve object placement and retrieval and avoid unnecessary index calculation and manipulation. Unlike other DHT based VBS storage systems or storage systems based on target storage objects that use indexing, the DHT, and data distribution schemes above may use logical indexing by implementing the hashing functions above based on the objects and other parameters to substantially improve storage system performance. The data distribution scheme 200 may be used with different DHT schemes that may be currently available. For example, additional functions or plug-ins may be added to some existing DHT schemes to implement the DHT and data distribution schemes above.

Figure 3:
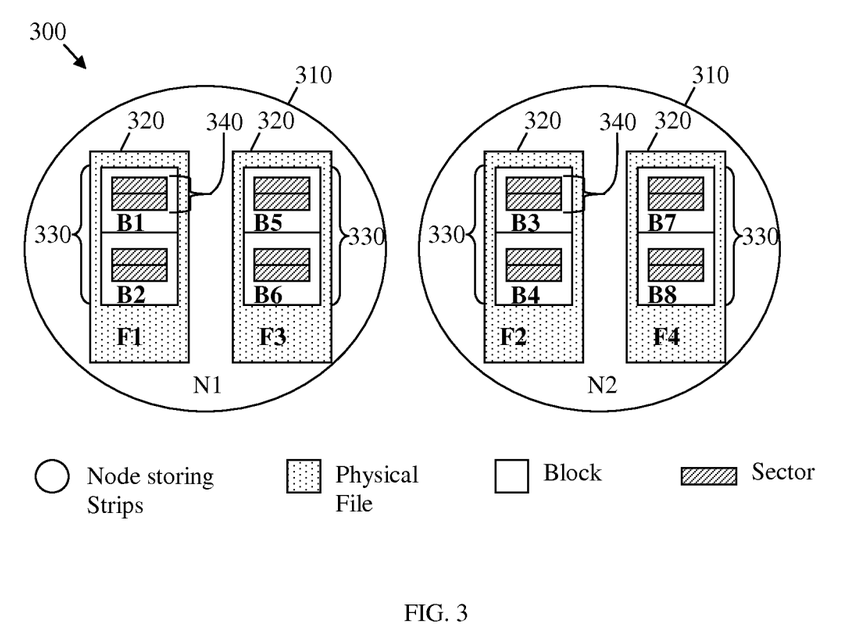
FIG. 3 is a schematic diagram of an embodiment of a file layout.

FIG. 3 illustrates an embodiment of a file layout 300, which may be used to improve random data distribution and volume access in a storage system, e.g. according to the storage system topology 100. The file layout 300 may be used in combination with the DHT and the data distribution schemes described above to improves the storage system read-write or throughput efficiency. The file layout 300 may be correspond to N=2 in the data distribution scheme 200. As such, the file layout 300 may comprise about two node storing strips 310 (labeled N1 and N2). Each node storing strip 310 may comprise about two physical files 320 (labeled F1, F2, F3, and F4), which may each comprise about two data blocks 330 (labeled B1 to B8). Each data block 330 may also comprise about two data sectors 340.

The size of each physical file 320 may be fixed, for example equal to about 10 Megabytes (MB). The size of the physical file 320 (e.g. data file) may be determined according to the number of data blocks 330 in the physical file 320, which may correspond to the number of strips within a data volume strip_number or s. The fixed data file size may simplify operations and improve sequential access efficiency in the node storing strips 310 (e.g. HDDs). The blocks 330 may be placed sequentially according to the corresponding block IDs inside each physical file 320. The block IDs may be distributed by a cyclic policy among the node storing strips 310. The sectors 340 may also be placed logically in a sequential manner inside each block 330 and may be ordered by corresponding sector IDs. The sequential placement of blocks and sectors in the file layout 300 may lead to a RAID0 like performance and increase the storage system throughput linearly. Further, the physical files 320 may be created according to a Lazy Creation scheme, where a physical file 320 may not be created until one sector 340 of that file is accessed, for example by a write operation to that sector from a user.

Figure 4:
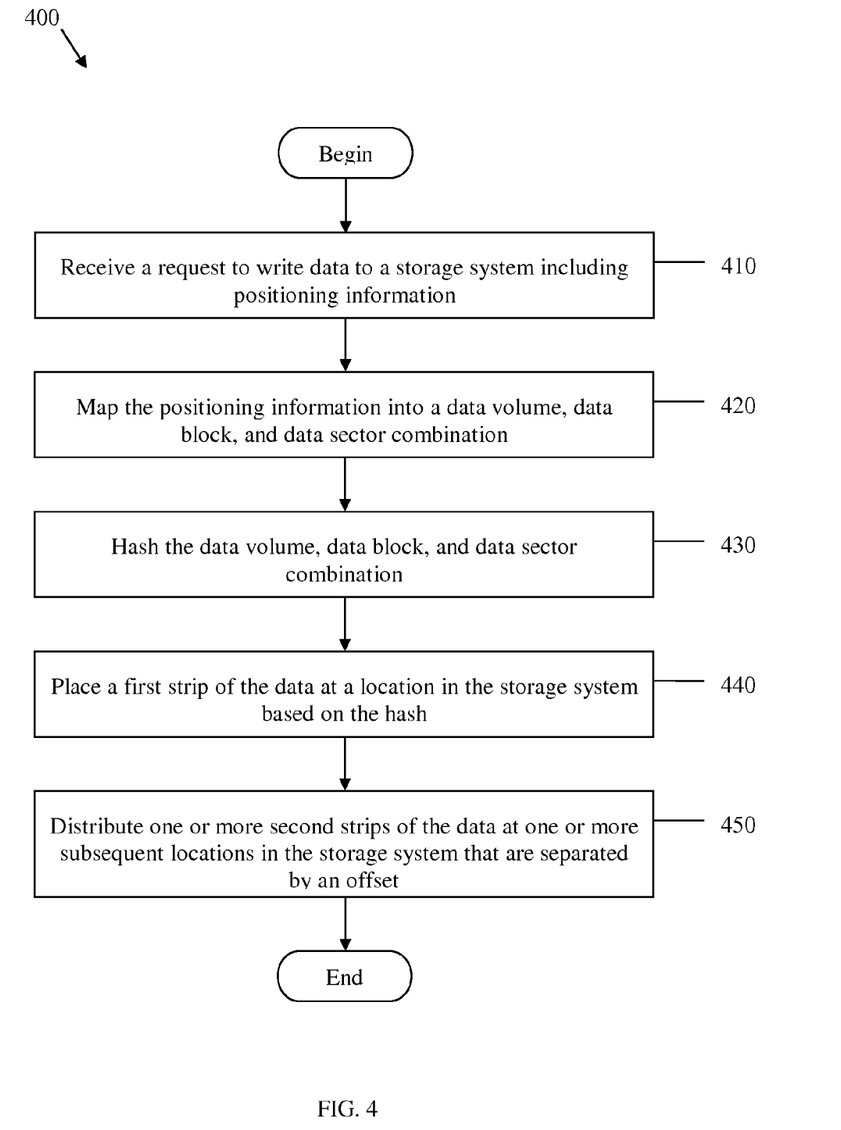
FIG. 4 is a flowchart of an embodiment of a data distribution method.

FIG. 4 illustrates an embodiment of a data distributor method 400, which may be used to distribute data in a storage system. The data distribution method 400 may be implemented by the storage system in the data distribution scheme 200 and support the DHT scheme based on the storage system topology 100 and the file layout 300. The data distribution method 400 may be used to place or fetch user requested data on or from a target storage node. The method 400 may begin at block 410, where a request to write or read data to a storage system may be received including positioning information. The request may be a VBS supported get or put API function that may be sent by a user's local file system. At block 420, the positioning information may be mapped into a data volume, data block, and data sector combination. The user's local file system may translate the user request from user visible positioning file information, such as <file path, offset>, to appropriate <Volume, Block, Sector> addressing information for placement of the data or file in the VBS system.

At block 430, the data volume, data block, and data sector combination may be hashed. At block 440, a first strip of the data may be placed or fetched at a location in the storage system based on hashing. For instance, the data volume, data block, and data sector information may be hashed using the hashing functions and parameters described in the data distribution scheme 200 to obtain a location to begin storing the data. The data volume, data block, and data sector and the hashing value (e.g. location) may be saved as a value and key pair, respectively, in an entry in a DHT, which may be stored locally at the storage node associated with the location. At block 450, one or more second strips of the data may be stored or retrieved at one or more subsequent locations in the storage system that are separated by an offset. The data strips may be distributed in a cyclical manner between the storage nodes, as described above. The data may be distributed in different nodes in a plurality of strips that comprise a sequential order of blocks and sectors, as indicated by the positioning information. Thus, the data or file may be accessed or retrieved in the order indicated by the corresponding strips, blocks, and sectors in the nodes. The method 400 may then end.

Figure 5:
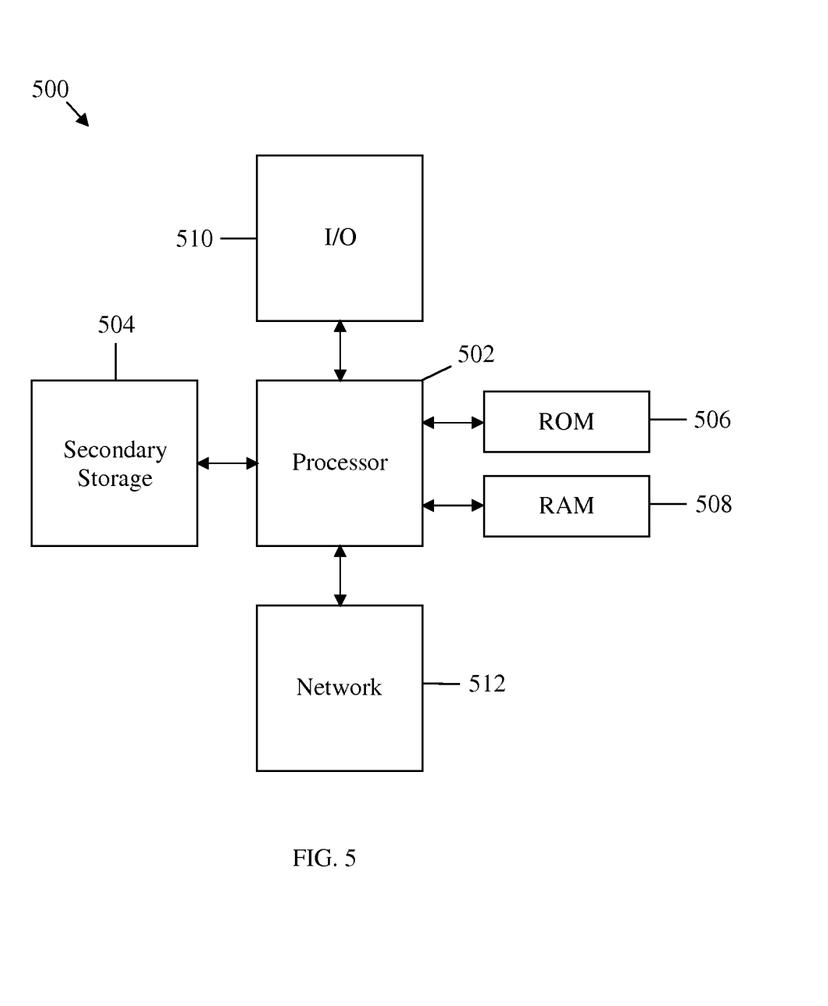
FIG. 5 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, RAM 508, I/O devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A storage system comprising:
a plurality of storage nodes comprising a plurality of corresponding storage disks and configured to store data in a distributed manner between the storage disks,
wherein the system achieves a Redundant Array of Independent Disks-0 (RAID0) performance based on positioning information and without indexing the distributed data,
wherein the positioning information comprises a (key, value) pair that is stored in a distributed hash table (DHT) and used to retrieve a value associated with a key, and
wherein the DHT is distributed over the storage nodes and is self-managed by the storage nodes.

2. The storage system of claim 1, wherein the storage disks are part of one or more cases, and wherein each of the storage nodes is associated with one or more storage disks or one or more cases.

3. The storage system of claim 2, wherein the DHT comprises an intra-case DHT to manage data distributed between different disks in the same case and an inter-case DI-IT to manage data distributed between different cases.

4. The storage system of claim 2, wherein the cases are part of one or more units, and wherein the units are part of one or more containers, and wherein the container is part of a data center.

5. The storage system of claim 2, wherein the storage disks comprise a plurality of computers, and wherein the computers each comprise a Central Processing Unit (CPU), a random access memory (RAM), a Flash/Solid State Drive (SSD), a hard disk drive (HDD), a one Gigabit per second (1G) Ethernet card, or combinations thereof.

6. A network component comprising:
a first storage disk configured to maintain a plurality of physical files for different user data that are mapped to different volumes,
wherein the volumes are distributed between the first storage disk and a second storage disk based on positioning information and without being indexed,
wherein the positioning information comprises a (key, value) pair that is stored in a distributed hash table (DHT) and used to retrieve a value associated with a key, and
wherein each key comprises a hash and each value comprises a data volume, a data block, and a data sector associated with stored data.

7. The network component of claim 6, wherein each of the volumes comprise a plurality of blocks that comprise a plurality of sectors, and wherein physical files of the storage disk comprise different blocks that comprise different sectors.

8. The network component of claim 7, wherein the physical files have fixed sizes that determine the quantity of blocks and sectors in each of the physical files.

9. The network component of claim 8, wherein the size of each of the physical files is equal to about 10 Megabytes (MB).

10. The network component of claim 7, wherein the blocks and the sectors are distributed in the physical files of the storage disk and a plurality of second storage files in the second storage disk sequentially according to corresponding block identifiers (IDs) and sector IDs, respectively, and wherein the block IDs and the sector IDs are assigned to the physical files using cyclic policy.

11. The network component of claim 7, wherein the physical files are created according to a Lazy Creation scheme, wherein the Lazy Creation scheme does not result in the creation of a first of the physical files until a sector associated with the first physical file is accessed by a user.

12. A method comprising:
receiving a first request to write data to a storage system wherein the first request comprises positioning information;
mapping the positioning information into a data volume data block and data sector combination;
hashing the data volume, data block, and data sector combination;
placing a first strip of the data at a location in the storage system based on the hash;
distributing one or more second strips of the data at one or more subsequent locations in the storage system that are separated from the location by an offset;
receiving a second request to read data from the storage system, wherein the second request comprises positioning information;
mapping the positioning information into the data volume, data block, and data sector combination;
hashing the data volume, data block, and data sector combination;
fetching the first strip of the data at the location in the storage system based on the hash; and
fetching the one or more second strips of the data at the one or more subsequent locations in the storage system.

13. A method comprising:
receiving a request to write data to a storage system, wherein the request comprises positioning information;
mapping the positioning information into a data volume, data block, and data sector combination;
hashing the data volume, data block, and data sector combination;

placing a first strip of the data at a location in the storage system based on the hash;

distributing one or more second strips of the data at one or more subsequent locations in the storage system that are separated from the location by an offset, wherein the data volume, data block, and data sector combination is hashed using a hashing function, F, that has a fixed range, Range(F), and wherein Range(F) defines a ring or cyclical range of values that starts from a minimum value, Min(Range(F)), and ends with a maximum value, Max(Range(F)).

14. The method of claim 13, wherein F is used to generate a random position based on a volume identifier (ID) for the data volume that corresponds to the first strip according to:

$$V(V\_id) = \text{location of Strip-0},$$

where V_id is the volume ID, V is the volume associated with the V_id, and Strip-0 indicates the first strip.

15. The method of claim 14, wherein the data is distributed using a strip placement function, Node, according to:

$$\text{Node}(G(V\_id, F, d, \text{strip\_number}), NC),$$

where G is a magic step function, d is the offset between each of the first strip and second strips and corresponds to a number of unused location between the locations of the first strip and second strips, strip_number is a function of a block identifier (ID) for the data block and a number of block IDs that fits in the first strip or second strips, and NC is a cluster node configuration in the storage system.

16. The method of claim 15, wherein the magic step function, G, provides one of the subsequent locations for one of the second strips according to:

$$G(V\_id, F, d, s) = F(V\_id) + (d*s)/\text{Range}(F),$$

where s is the strip_number.

17. The method of claim 15, wherein the relationship between the strip_number, the block ID is defined as:

$$\text{strip\_number} = (\text{block\_id}/s)/N,$$

where block_id is the block ID, s is the strip_number, and N is the number of locations for the first strip and second strips.

18. The method of claim 12, wherein the first request is a get request that includes:

put (start_position_key <address_bits>, data <bytes>).

19. The method of claim 12, wherein the second request is a get request that includes:

get (start_position_key <address_bits>, number_of_items<int>).

* * * * *

UNITED STATES PATENT AND TRADEMARK OFFICE
CERTIFICATE OF CORRECTION

PATENT NO. : 8,996,803 B2  Page 1 of 1
APPLICATION NO. : 12/965538
DATED : March 31, 2015
INVENTOR(S) : Guangyu Shi et al.

It is certified that error appears in the above-identified patent and that said Letters Patent is hereby corrected as shown below:

In the claims:

Column 9, Lines 54-57, Claim 3, should read as:
-- 3. The storage system of claim 2, wherein the DHT comprises an intra-case DHT to manage data distributed between different disks in the same case and an inter-case DHT to manage data distributed between different cases. --

Column 10, Lines 37-60, Claim 12, should read as:
-- 12. A method comprising:
receiving a first request to write data to a storage system, wherein the first request comprises positioning information;
mapping the positioning information into a data volume, data block, and data sector combination;
hashing the data volume, data block, and data sector combination;
placing a first strip of the data at a location in the storage system based on the hash;
distributing one or more second strips of the data at one or more subsequent locations in the storage system that are separated from the location by an offset;
receiving a second request to read data from the storage system, wherein the second request comprises positioning information;
mapping the positioning information into the data volume, data block, and data sector combination;
hashing the data volume, data block, and data sector combination;
fetching the first strip of the data at the location in the storage system based on the hash; and
fetching the one or more second strips of the data at the one or more subsequent locations in the storage system. --

Signed and Sealed this
Thirteenth Day of October, 2015

Michelle K. Lee
*Director of the United States Patent and Trademark Office*